(No Model.) 6 Sheets—Sheet 1.

D. BRENNAN, Jr.
STONE AND ORE CRUSHER.

No. 315,469. Patented Apr. 14, 1885.

WITNESSES:

INVENTOR:
D. Brennan Jr.
BY
ATTORNEYS.

(No Model.)  6 Sheets—Sheet 2.

D. BRENNAN, Jr.
STONE AND ORE CRUSHER.

No. 315,469. Patented Apr. 14, 1885.

WITNESSES:

INVENTOR:
D. Brennan Jr
BY Munn & Co
ATTORNEYS.

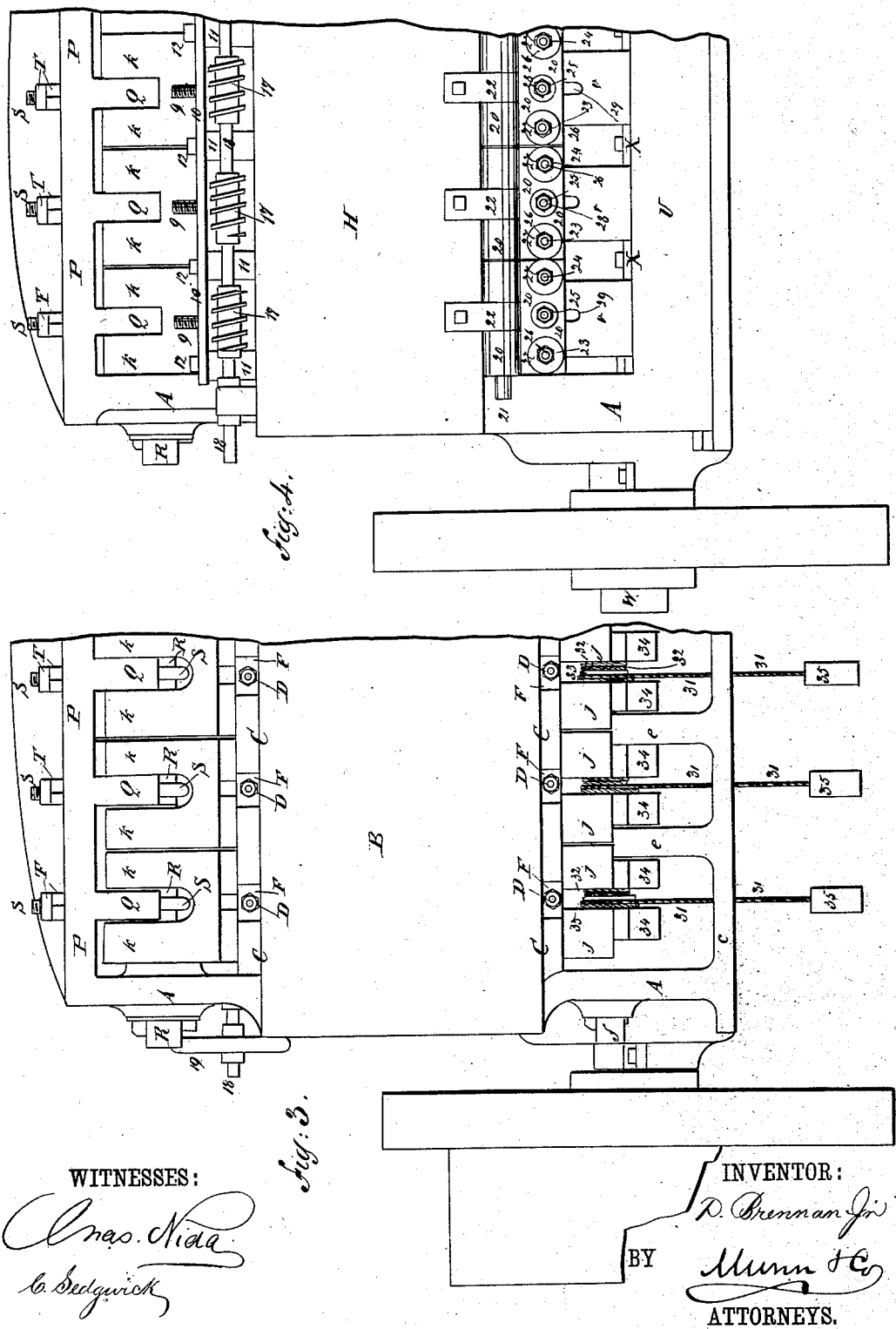

(No Model.) 6 Sheets—Sheet 4.
D. BRENNAN, Jr.
STONE AND ORE CRUSHER.
No. 315,469. Patented Apr. 14, 1885.
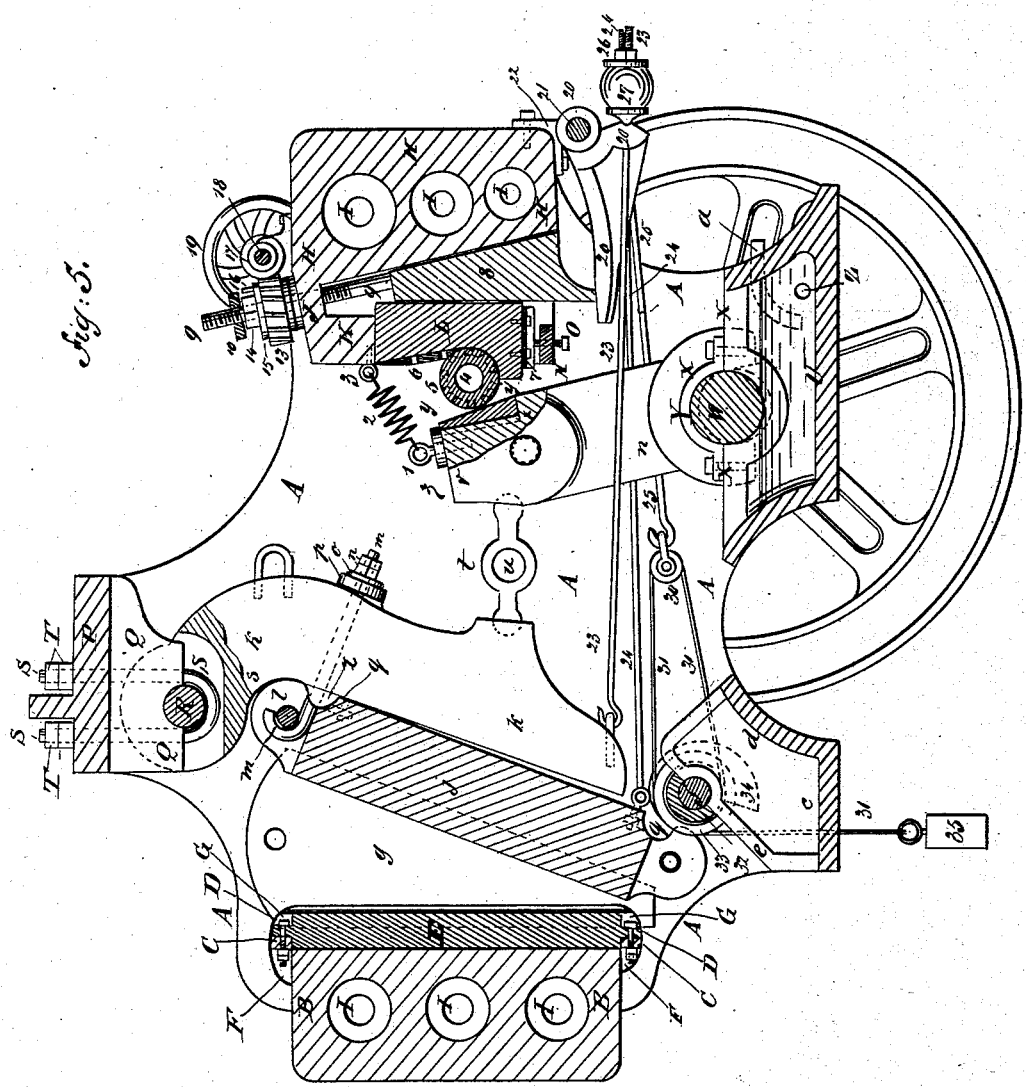
WITNESSES:
INVENTOR:
D. Brennan Jr
BY Munn & Co
ATTORNEYS.

(No Model.) 6 Sheets—Sheet 5.

D. BRENNAN, Jr.
STONE AND ORE CRUSHER.

No. 315,469. Patented Apr. 14, 1885.

WITNESSES:

INVENTOR:
D. Brennan Jr
BY Munn & Co
ATTORNEYS.

(No Model.) 6 Sheets—Sheet 6.
D. BRENNAN, Jr.
STONE AND ORE CRUSHER.
No. 315,469. Patented Apr. 14, 1885.
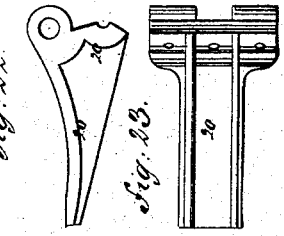
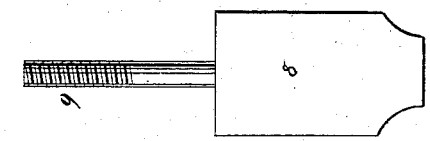
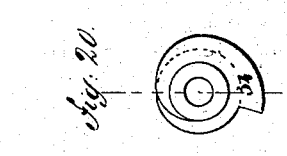
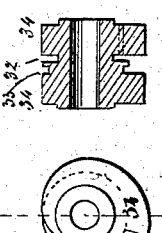
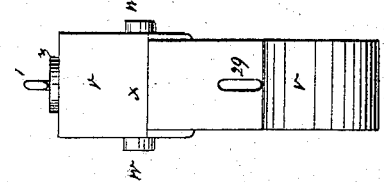
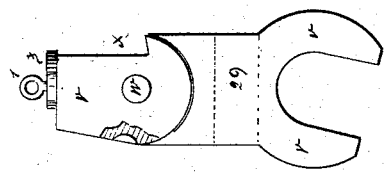
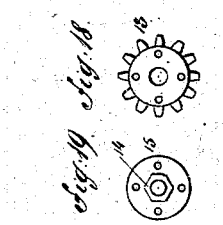
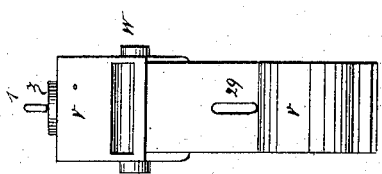
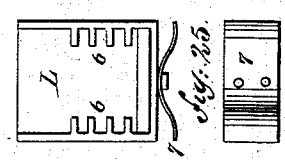
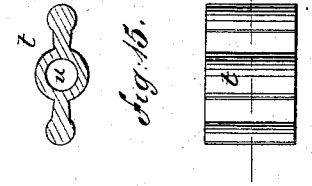
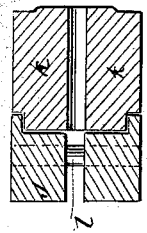
WITNESSES:
INVENTOR:
D. Brennan Jr.
BY Munn & Co
ATTORNEYS.

UNITED STATES PATENT OFFICE.

DANIEL BRENNAN, JR., OF BAYONNE, (SALTERSVILLE P. O.,) NEW JERSEY.

STONE AND ORE CRUSHER.

SPECIFICATION forming part of Letters Patent No. 315,469, dated April 14, 1885.

Application filed May 19, 1884. (No model.)

*To all whom it may concern:*

Be it known that I, DANIEL BRENNAN, Jr., of Bayonne, (Saltersville P. O.,) in the county of Hudson and State of New Jersey, have invented certain new and useful Improvements in Stone and Ore Crushers, of which the following is a full, clear, and exact description.

Reference is to be had to the accompanying drawings, forming part of this specification, in which similar letters of reference indicate corresponding parts in all the figures.

Figure 1:
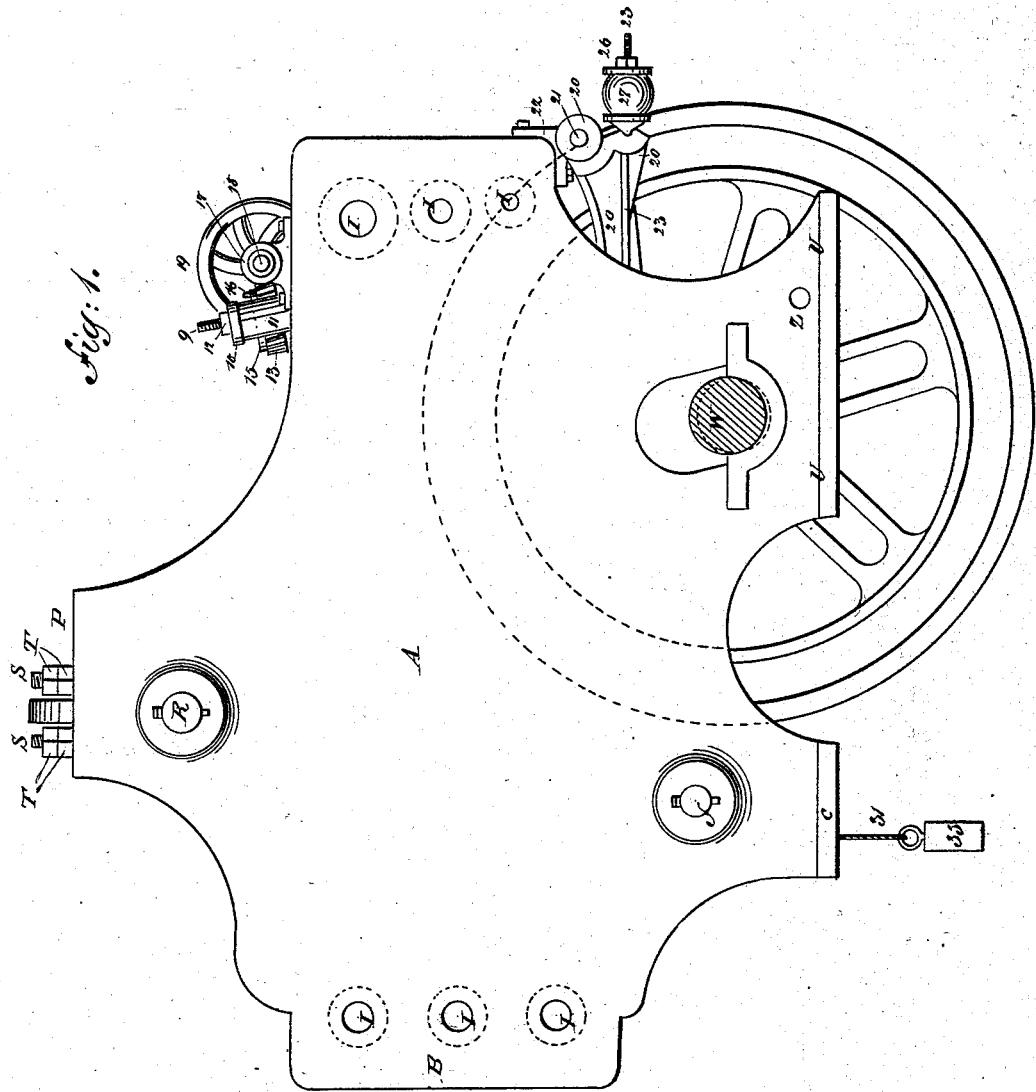
Figure 2:
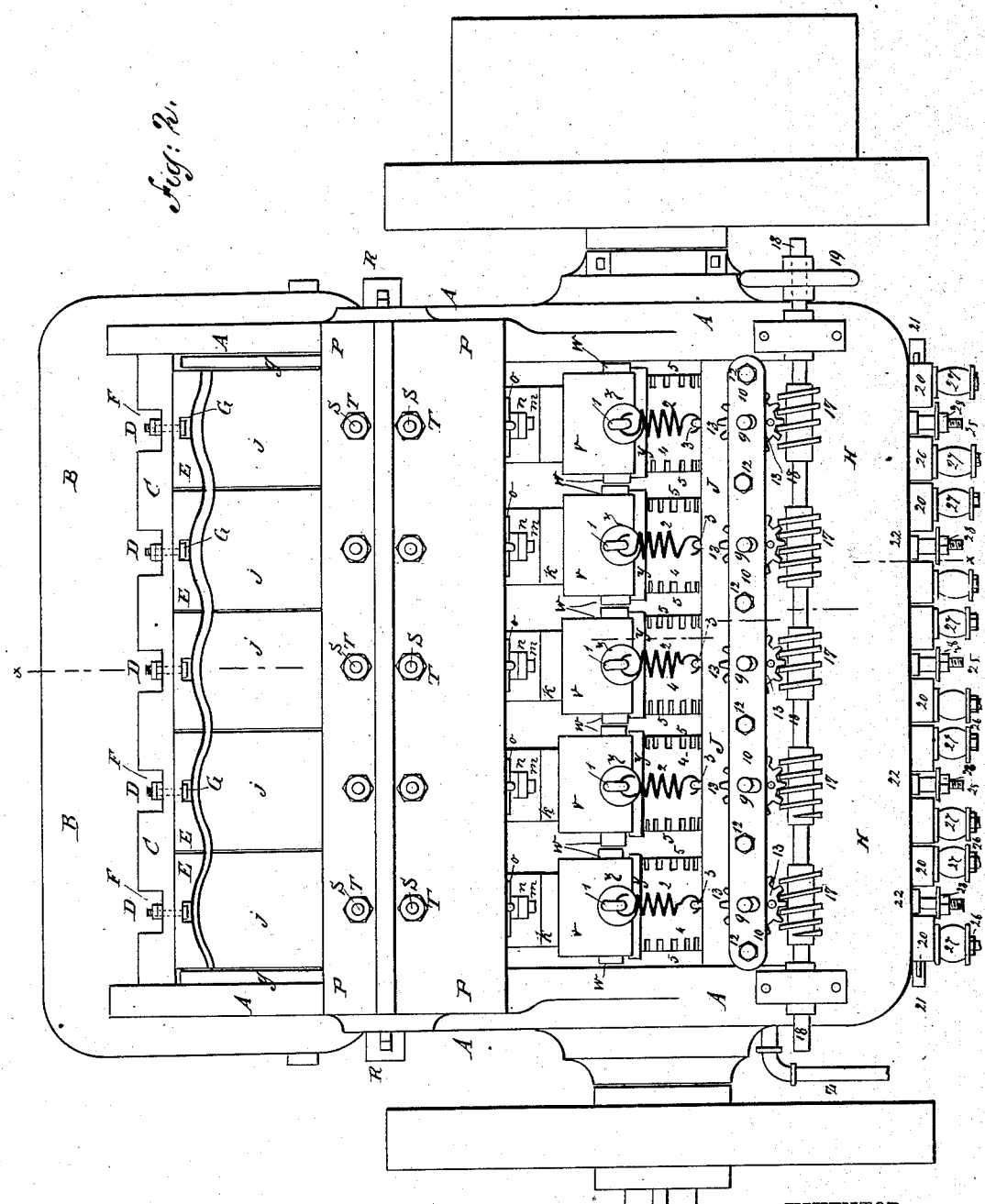
Figure 6:
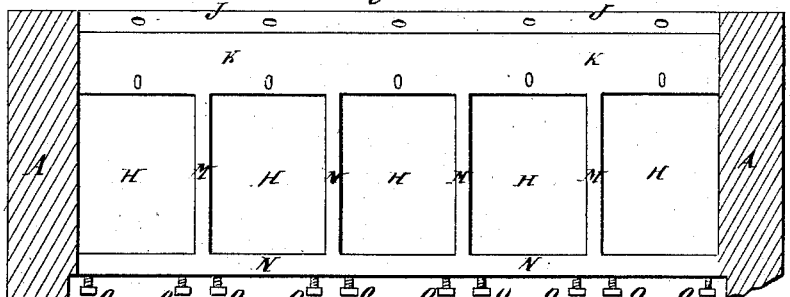
Figure 7:
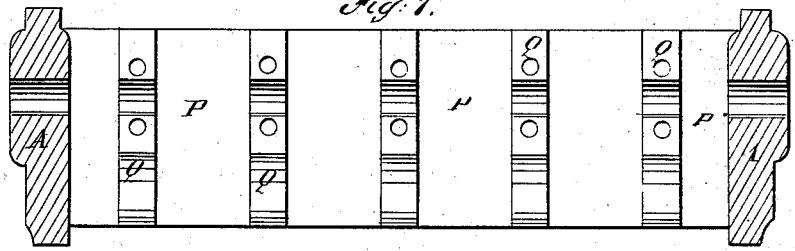
Figure 8:
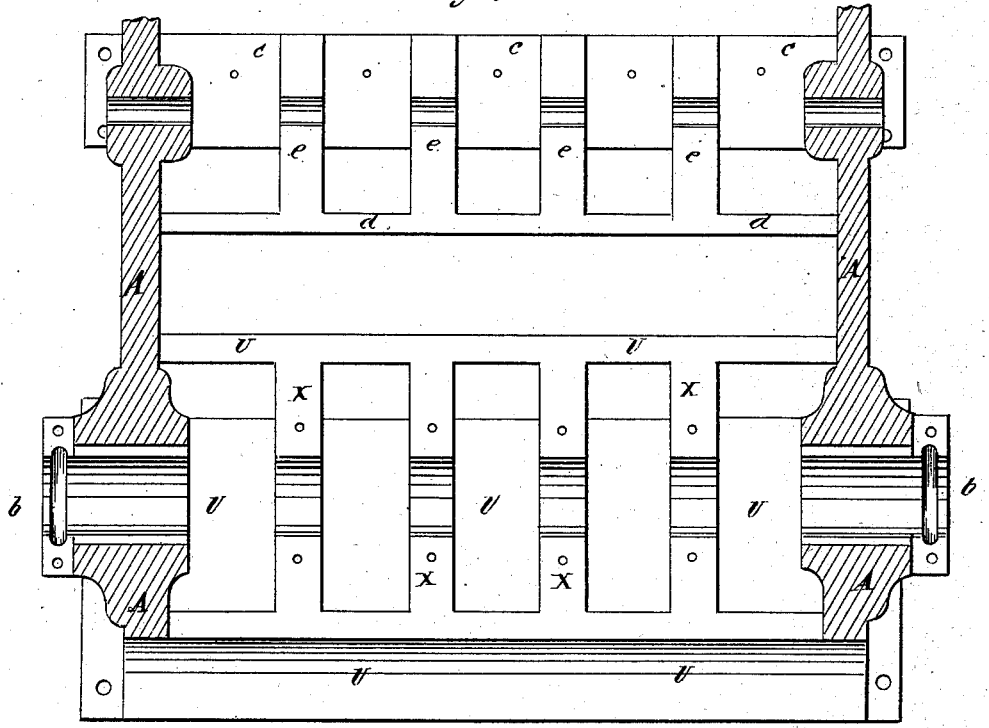

Figure 1 is a side elevation of my improvement, the crank-shaft being shown in section. Fig. 2 is a plan view of the same. Fig. 3 is a front elevation of a part of the same. Fig. 4 is a rear elevation of a part of the same. Fig. 5 is a sectional side elevation of the same, taken through the broken line $x\ x$, Fig. 2. Fig. 6 is a sectional elevation of the rear part of the frame. Fig. 7 represents the under side of the head-block, the sides of the frame being shown in section. Fig. 8 is a sectional plan view of the lower part of the frame. Figs. 9 to 25, inclusive, are views of various parts of the machine in detail.

The object of this invention is to improve the construction of stone and ore crushers in such a manner that they can be made of greater capacity than has hitherto been practicable without too much increasing their weight.

A further object of the invention is to adapt stone and ore crushers to reduce the material more uniformly and to a smaller size than such machines heretofore made.

A further object of this invention is to provide efficient and reliable means for controlling and regulating the various parts of the machines.

The invention consists in a stone and ore crusher constructed with the ends of the frame hollow, whereby great strength is obtained without too much weight. The frame is constructed with a head-block provided with flanges, against which the shaft that carries the movable jaws is held by U-bolts, whereby the said movable jaws will be firmly supported and held against upward thrust and rearward pressure. The upper end of the rear part of the movable jaw has a forwardly-projecting curved shoulder formed upon it, against which the upper end of the forward part of the said jaw is held by a hook-bolt and a spring, whereby the said forward part of the jaw will be hinged to the said rear part, will be firmly supported against upward thrust, and will have a slight yield when its lower part is subjected to undue strain. Upon the forward side of the rear part of the movable jaw is formed a projection which fits into a corresponding recess in the rear side of the forward part of the jaw to strengthen the connection between the two parts. With the lower rear parts of the sides of the frame is connected an oil-chamber having inlet and outlet pipes and provided with bearings to receive the intermediate bearings of the eccentric shaft, whereby the said eccentric shaft can be kept lubricated and cool. The eccentric shaft is made with spirally-arranged eccentrics, and with bearings between the adjacent eccentrics, whereby the pressure upon the shaft will be distributed and the said shaft firmly supported. The end bearings for the eccentric shaft are provided with annular grooves to receive packing to prevent the oil from escaping around the said shaft.

With the lower forward part of the sides of the frame is connected a foot-block provided with flanges having bearings to receive the cam-shaft, whereby the said cam-shaft will be firmly supported. The front end of the frame is provided with recessed projections to receive the bolts that fasten the recessed ends of the stationary jaws, whereby the said jaws will be securely held in place and can be readily reversed. The pitman is made with a forked lower end to receive an eccentric, a recess in its upper forward part to receive the toggle-bar, and a recess in its upper rear part to receive a bearing-block.

Between the rear part of the movable jaw and the pitman is interposed a toggle-bar having an apertured middle part, whereby the said toggle-bar will break, if exposed to undue pressure, to prevent injury to the machine.

Between the pitman and the recessed and toothed back block is interposed a separable bearing-block and a roller having end teeth, whereby the said pitman is provided with a movable and varying resistance bearing.

Between the lower end of the back block and the set-screws of the supporting-bar is interposed a spring, whereby the said back block will be held to its seat and kept from injuring the said set-screws by its movements.

Between the projecting lower ends of the wedges and the jaw-rods and their springs are interposed elbow-levers pivoted to a shaft attached to the machine-frame, whereby the said springs will be kept at the same tension.

Between the lower ends of the forward parts of the movable jaws and rods attached to the elbow-levers are interposed cords, pairs of unequal pulleys, cams, and suspended weights, whereby the lower ends of the movable and stationary jaws are kept at a uniform distance apart.

With the worms and worm-shaft and the wedge-screws and their supporting-web are connected perforated worm-wheels, nuts having perforated flanges, and locking-pins, and a stay-bar and its standards and screw-bolts, whereby the wedges can be adjusted together or separately.

Between the pitman and the back-block bearing is interposed a spring to hold the said pitman in place should the toggle-bar break, as will be hereinafter fully described and claimed.

A represents the sides of the frame of the machine. B is the front end of the frame, which has a projection, C, upon the forward part of its top and bottom.

In the projections C, at suitable distances apart, are formed holes to receive the bolts D that fasten the ends of the stationary jaws E to the said end B.

In the projections C are formed recesses F to receive the nuts of the bolts D, and in the ends of the jaws E are formed recesses G to receive the heads of the said bolts. Both ends of the jaws E are made alike, so that the said jaws can be reversed when they become worn at one end. The front end, B, and the rear end, H, of the frame have cavities I formed in them in casting, to obtain greater strength with the same amount of metal. The cavities I, after passing through the sides of the frame, become larger, as shown in Fig. 5, and in dotted lines in Fig. 1.

With the inner side of the top of the rear end, H, is connected by an inclined web, J, the bearing K for the back blocks, L. The bearing K is also connected with the sides A of the frame. The bearing K is further strengthened by flanges M, formed upon the inner side of the end H, between the back blocks, L, as shown in Fig. 6. With the flanges M and the sides A of the frame is connected the supporting-bar N, through which are formed screw-holes to receive the set-screws O, for the purpose hereinafter described. The forward middle parts of the sides A are extended upward, and to them are secured the ends of the head-block P, upon the lower side of which are formed flanges Q, having half-bearings in their lower edges for the jaw-shaft R to rest against, to strengthen the said shaft against the pressure of the jaws. The shaft R is drawn and held against the bearings in the flanges Q by the U-bolts S, the bends of which pass around the said shaft, and their arms pass through the said flanges Q and the head-block P, as shown in Figs. 3, 4, and 5, and are secured in place by nuts T, screwed upon their ends. The rear parts of the sides A of the frame are extended downward, and to them is secured a trough U, (see Figs. 1, 4, 5, and 8,) to form an oil and water chamber for lubricating and cooling the eccentrics V of the shaft W, the end journals of which revolve in bearings attached to the said sides A.

To the front and rear walls of the chamber U are attached bearings X, in which revolve journals Y, (see Figs. 5 and 9,) formed upon the shaft W, between the adjacent eccentrics or cranks V, so that the said shaft will be firmly supported against downward pressure. The water is introduced into one end of the trough U, near the bottom, through a pipe, Z, secured in a hole in the lower part of the side A of the frame, and escapes through the pipe a, the inner end of which extends nearly to the bottom of the said trough U, and which passes through the side of the trough at such a height that the eccentrics V and journals Y of the shaft W will always be in contact with the oil poured upon the surface of the water passing through the trough U, and will thus be kept lubricated. With this construction the arrangement of the discharge-pipe a prevents the oil from escaping, so that a stream of water can be made to pass constantly through the trough U and keep the oil and with it the eccentrics V and journals Y cool. In the end bearings formed in the sides A of the frame for the eccentric shaft W are formed grooves b (see Fig. 8) to receive packing-rings placed upon the end journals of the said shaft to keep the oil from escaping around the said journals. The forward parts of the sides A are extended downward, and to them are attached the ends of a foot bar or plate, c, which is strengthened by a flange, d, along its inner edge, and is provided with webs or bars e (see Figs. 3, 5, and 8) to serve as bearings for the cam-shaft f. The ends of the cam-shaft f rest in bearings in the sides A.

g are cheek or wear plates, which are placed in recesses in the sides A at the outer edges of the outer jaws, E and j k, as shown in Fig. 2. The wearing-faces of the jaws E and j k may have the shape shown in Fig. 2, or any other suitable shape.

The movable jaws are each made in two parts, j k. The upper end of the forward part, j, is hinged to the part k near its upper end by the pin l passing through the said part j, and the hook-bolt m, hooked upon the said pin and passing through the part k nearly at right angles therewith, where it is secured in place by the nuts n (see Figs. 2 and 5) and washer o. A spring, p, of rubber or other suitable material is interposed between the nuts n and jaw k to allow a slight movement of the said hook-bolt, and jaw, and thus prevent undue strain should the movable jaw come too close to or touch the stationary jaw. With this construction the hook-bolt m can be withdrawn in a direction over the front end, B, of the frame, so that the part j of the movable jaw can be removed or reversed without taking out the rear part, k. The ends of the parts j are slotted to receive the hook-bolts m, and in the rear sides of the said parts, just below the pins l, are formed rounded recesses q, to receive correspondingly-shaped projections r, formed upon the forward sides of the rear parts, k. The upper end of the rear part, k, of the movable jaw is slotted to receive the flange Q and U-bolt S. It is perforated to receive the shaft R, and is extended forward to form a shoulder, s, to receive the thrust of the movable part j of the jaw. The shoulder s is concaved or rounded, and the upper end of the part j is correspondingly rounded, so that the two parts will move easily upon each other. In the lower part of the rear side of the part k of the movable jaw is formed a recess (see Fig. 5) to serve as a seat for the toggle-bar t, the middle part of which is enlarged, as shown in Figs. 5, 15, and 16, and has an opening, u, formed through it, so that the said bar will break if subjected to an undue pressure, and thus prevent the other parts of the machine from being broken. Toggle-bars t of different lengths are provided, so that if the other adjustments should become exhausted from the wear of the parts a longer toggle-bar can be put in. The rear ends of the toggle-bars t rest in recesses in the forward upper parts of the pitmen v, as shown in Fig. 5. The lower end of the pitman v is forked, as shown in Fig. 11, to receive and ride upon an eccentric, V, of the shaft W, where it will be held in place by its own weight and the downward pressure upon it, no strap or cap being required. Upon the opposite sides of the upper part of each pitman v are formed hubs or projections w, so that the pitmen can be easily fitted to work inside the frame and against each other without being too tight.

In the rear side of the upper end of the pitman v is formed a seat, x, (see Figs. 5 and 11,) for the roller-bearing block y. The lower or thicker end of the bearing-block y is slightly dovetailed, and upon its side edges are formed flanges which overlap the sides of the upper end of the pitman v to hold the said bearing-block from lateral movement. The bearing-block y is held down to its seat by a disk, z, placed upon the upper end of the pitman v, and secured in place by an eye-screw, 1, that passes through it and into a screw-hole in the upper end of the said pitman v. With this construction the bearing-block y can be readily removed and changed, when desired.

To the eye-screw 1 is attached the end of a spiral spring, 2, the other end of which is attached to an eye-screw, 3, inserted in a screw-hole in the lower part of the forward side of the back-block bearing K. The spring 2 is designed to hold the pitman v in place, and prevent it from breaking the machine in case the toggle-bar t should break.

The amount of inclination of the bearing-surface of the block y will affect the amount of the thrust of the movable jaw, since, if the sides of the said block were parallel, the said jaw would only have the amount of stroke or thrust due to the straightening of the toggle-bar t, while any difference there may be in the thickness of the said block during the upward travel of the pitman v will be added to the length of the said stroke. Several bearing-blocks, y, of different taper, are designed to be provided and used, as the nature of the work to be done, the amount of thrust wanted, and the wear of the bearings of the pitman may require.

4 is a roller interposed between the bearing-block y and the back block, L, to change the friction from a sliding friction to a rolling friction. Around the ends of the roller 4 are mortised teeth 5 (see Figs. 2 and 5) to mesh into corresponding teeth, 6, (see Fig. 24,) formed in the forward edges of the back block, L. The face of the said back block is recessed to receive the roller 4, and has a forward projection on its lower part to support the said roller when at the end of its downward movement.

The teeth 5 6 of the roller 4 and back block, L, are not intended to resist pressure, that being done by the plain surfaces, but to prevent the said roller from slipping.

To the lower end of the back block, L, is secured, by screws or other suitable means, the upwardly-curved middle part of a spring, 7, the end parts of which rest upon the upper ends of the set-screws O, hereinbefore described. The spring 7 holds the back block, L, up against the bearing K, and prevents the set-screws O from being injured by the movements of the back block, L, when the wedge 8 is adjusted. The set-screws O enable the wear to be taken up, so that the spring 7 will always hold the back block, L, closely against the bearing K. The wedge 8 (see Figs. 5 and 8) is inserted, narrow end upward, between the back block, L, and the inclined inner surface of the rear end, H, of the frame. The upper end of the wedge 8 is provided with a screw-bolt, 9, which passes up through holes in the inclined web J and through holes in the stay-bar 10. The stay-bar 10 rests on hollow standards 11, and is secured in place by screw-bolts 12, passing through the said stay-bar and the said hollow standards and screwing into the frame of the machine. Upon the bolts 9, between the web J and the stay-bar 10, is placed the loose worm-wheel 13 and the nuts 14. The nuts 14 have outwardly-projecting flanges 15 formed around their lower parts, which are perforated to receive the pins 16. The pins 16, after passing through the flanges 15, enter corresponding holes in the worm-wheels 13, so that the nuts 14 will be turned to raise and lower the wedges 8 by turning the worm-wheels 13, and so that by removing the pins 16 the nuts 14 can be turned with a wrench to adjust each wedge separately as the unequal wear of the jaws may require. The nuts 14, when turned in the direction to lower the wedges 8, are held in place against the upward pressure by the stay-bar 10. The teeth of all the worm-wheels 13 mesh into the threads of worms 17, (see Figs. 1, 2, and 5,) attached to a shaft, 18, which revolves in bearings attached to the frame of the machine, and is provided at one end with a hand-wheel, 19, so that it can be readily turned to raise or lower all the wedges 8 at one operation. The forward part of the lower end of each wedge 8 is extended downward and rests upon the upper side of the long arm of an elbow-lever, 20, (see Figs. 1, 5, 22, and 23,) which is pivoted at its angle to a shaft, 21, carried in bearings 22, attached to the lower part of the rear end, H, of the frame. The lever 20 is strengthened by webs, as shown in Figs. 5, 22, and 23, and is arranged with its short arm projecting downward. The short arm of the elbow-lever 20 has three holes formed through it, through which pass the rear ends of the jaw-rods 23 24 and the cam-rods 25. Upon the rear ends of the rods 23 24 are secured, by nuts 26, springs 27, of rubber or other suitable material. The rods 23 24 pass forward upon the opposite sides of the pitmen $v$, and their forward ends are attached, respectively, to the rear sides of the lower ends of the rear and forward parts, $k\ j$, of the movable jaws, and with their springs are designed to draw the said jaws $k\ j$ back after making a stroke. The levers 20 are so proportioned and placed that a movement of the wedges 8 causes a corresponding movement of their shorter and longer arms, so as to keep the springs 27 at the same tension at every part of the travel of the said wedges, thus avoiding the necessity of stopping the machine and regulating the tension of the springs every time the wedges 8 are adjusted. The tension of the springs 27 can be adjusted separately, as required from the unequal wear of the jaws, by means of the nuts 26. The cam-rods 25 (see Fig. 5) are connected with the middle parts of the short arms of the levers 20, have nuts 28 (see Fig. 2) screwed upon their rear ends, pass forward through slots 29 (see Figs. 11 and 13) in the pitmen $v$, and at their forward ends are each connected with the block of a pulley, 30, around which passes a rope, 31. One end of the rope 31 is wound around and attached to the smaller of two pulleys, 32 33, (see Figs. 3 and 5,) interposed between two cams, 34. (See Figs. 20 and 21.) The pair of cams 34 and the pair of pulleys 32 33 can be made in one piece, as shown in Fig. 21, or they can be made separately and rigidly connected together, as may be desired or convenient. The other part of the rope 31 passes around the larger pulley 33 in the opposite direction from the first part, and to its end is attached a weight, 35. The weight 35 can be suspended directly beneath the forward part of the machine, or it can be suspended in any convenient place by passing the rope 31 around guide-pulleys. The cams 34 are placed loosely upon the shaft $f$, and are so proportioned that they will all have the same amount of throw for a given amount of revolution when moved collectively, however much they may differ from each other in position on account of the unequal wear of the jaws. With this construction a movement of the wedge 8 acting through the elbow-lever 20 will move the weight 35 and readjust the cams 34, so that the lower end of the front part, $j$, of the movable jaw will continue to have the same proportionate amount of stroke relatively to the stroke of the back part, $k$, of the said jaw as it had before the adjustment. The cams 34 can be adjusted separately by means of the nuts 28 upon the rear ends of the cam-rods 25, so as to compensate for the unequal wear of the jaws. By adjusting the cams 34 the lower ends of the forward parts, $j$, of the movable jaws will be held from moving back from the lower end of stationary jaw E, so that the material must be crushed to the desired fineness before it can escape from the machine. With this construction the machines can be made so large that a cart or car load of stone or ore can be dumped into the space between the stationary and movable jaws, so as to avoid laborious hand-feeding.

Having thus described my invention, what I claim as new, and desire to secure by Letters Patent, is—

1. In a stone and ore crusher, the ends B H of the frame, having cavities I, transverse to the length of the frame, extending therethrough, the said cavities increasing in diameter after passing through the sides of the frame, substantially as set forth.

2. In a stone and ore crusher, the combination, with the sides A of the frame, the shaft R, and the movable jaws $k\ j$, of the head-block P, having bearing-flanges Q, and the U-bolts S, substantially as herein shown and described, whereby the said movable jaws will be firmly supported and held against upward thrust and rearward pressure, as set forth.

3. In a stone and ore crusher, the combination, with the rear part, $k$, of the movable jaw, having curved shoulder $s$, and the forward part, $j$, having slotted upper end, of the pin $l$, the hook-bolt $m$, and the spring $p$, substantially as herein shown and described, whereby the said forward part of the jaw will be hinged to the rear part, will be firmly supported against upward thrust and rearward pressure, and will have a slight yield when its lower part is subjected to undue strain, as set forth.

4. In a stone and ore crusher, the combination, with the rear part, $k$, of the movable jaw having projection $r$, of the forward part, $j$, having recess $q$, substantially as herein shown and described, to strengthen the connection between the said parts of the jaw, as set forth.

5. In a stone and ore crusher, the combination, with the sides A of the frame, and the eccentric shaft W, having intermediate bearings, Y, of the oil-chamber U, having inlet and outlet pipes Z $a$, and the bearings X, substantially as herein shown and described, whereby the said eccentric shaft can be kept lubricated and cool and will be firmly supported, as set forth.

6. In a stone and ore crusher, the eccentric shaft W, made, substantially as herein shown and described, with spirally-arranged eccentrics V, and with bearings Y, between the adjacent eccentrics, whereby the pressure will be distributed and the said shaft firmly supported, as set forth.

7. In a stone and ore crusher, the combination, with the sides A of the frame and the cam-shaft $f$, of the foot-block $c$, having flange $d$, and a series of bearings, $e$, substantially as herein shown and described, whereby the said cam-shaft will be firmly supported, as set forth.

8. In a stone and ore crusher, the combination, with the front end, B, of the frame, having recessed projections C, and the stationary jaws E, having recesses G in their ends, of the bolts D, substantially as herein shown and described, whereby the said jaws will be securely held in place and can be readily reversed, as set forth.

9. In a stone and ore crusher, the pitman $v$, made, substantially as herein shown and described, with a forked lower end to receive an eccentric, a recess in its upper forward part to receive a toggle-bar, and a recess in its upper rear part to receive a bearing-block, as set forth.

10. In a stone and ore crusher, the combination, with the rear part, $k$, of the movable jaw, and the pitman $v$, of the toggle-bar $t$, having apertured middle part, substantially as herein shown and described, whereby the said toggle-bar will break if exposed to undue pressure to prevent injury to the machine, as set forth.

11. In a stone and ore crusher, the combination, with the pitman $v$ and the recessed and toothed back block, L, of the separable bearing-block $y$, and the roller 4, having end teeth, 5, substantially as herein shown and described, whereby the said pitman is provided with a movable and varying resistance-bearing, as set forth.

12. In a stone and ore crusher, the combination, with the back block, L, the supporting-bar N, and the set-screws O, of the spring 7, substantially as herein shown and described, whereby the said back block will be held to its seat and kept from injuring the said set-screws by its movements, as set forth.

13. In a stone and ore crusher, the combination, with the rear end, H, of the frame, the wedges 8, having projecting lower ends, the jaw-rods 23 24, and the springs 27, of the elbow-levers 20 and the supporting-shaft 21, substantially as herein shown and described, whereby the said springs will be kept at the same tension, as set forth.

14. In a stone and ore crusher, the combination, with the lower ends of the forward parts, $j$, of the movable jaws, the shaft $f$, the rods 25, and the elbow-levers 20, of the pulley 30, the rope 31, the weight 35, the cams 34, and the unequal pulleys 32 33, substantially as herein shown and described, whereby the lower ends of the movable and stationary jaws are kept at a uniform distance apart, as set forth.

15. In a stone and ore crusher, the combination, with the worms 17 and worm-shaft 18, the inclined web J and the wedge-screws 9, of the perforated worm-wheels 13, the nut 14, having perforated flange 15, the locking-pins 16, the stay-bar 10, and its standards 11, and screw-bolts 12, substantially as herein shown and described, whereby the wedges can be adjusted together or separately, as set forth.

16. In a stone and ore crusher, the combination, with the pitman $v$ and the back-block bearing K, of the spring 2, substantially as herein shown and described, whereby the said pitman will be held in place should the toggle-bar break, as set forth.

DANIEL BRENNAN, JR.

Witnesses:
JAMES T. GRAHAM,
C. SEDGWICK.